(No Model.)  3 Sheets—Sheet 1.
R. M. HENDERSON.
PLOW AND CULTIVATOR.
No. 323,676. Patented Aug. 4, 1885.
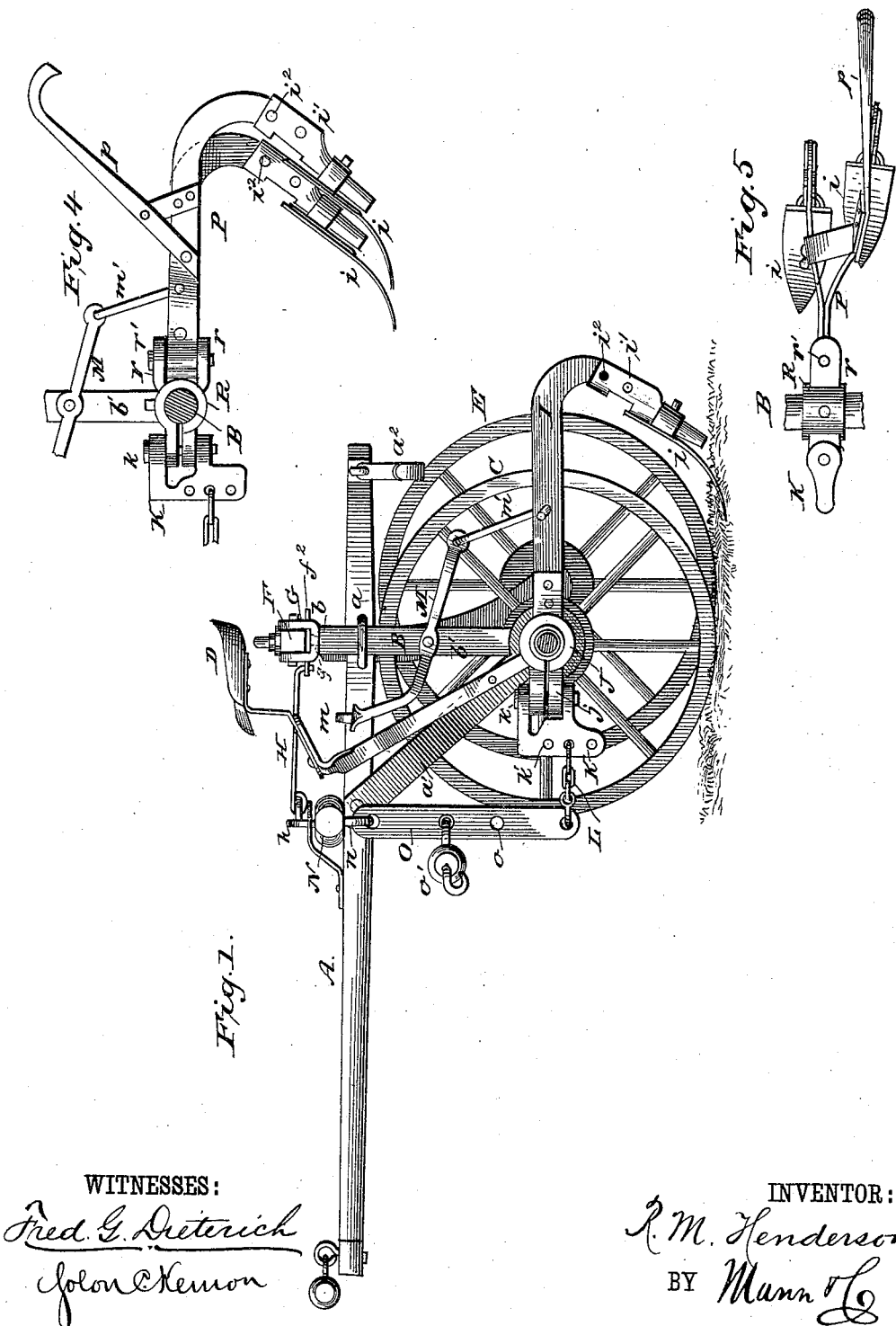
WITNESSES:
Fred. G. Dieterich
Solon C. Kemon
INVENTOR:
R. M. Henderson
BY Mann & Co.
ATTORNEYS.

(No Model.)  R. M. HENDERSON.  3 Sheets—Sheet 2.
PLOW AND CULTIVATOR.
No. 323,676.  Patented Aug. 4, 1885.
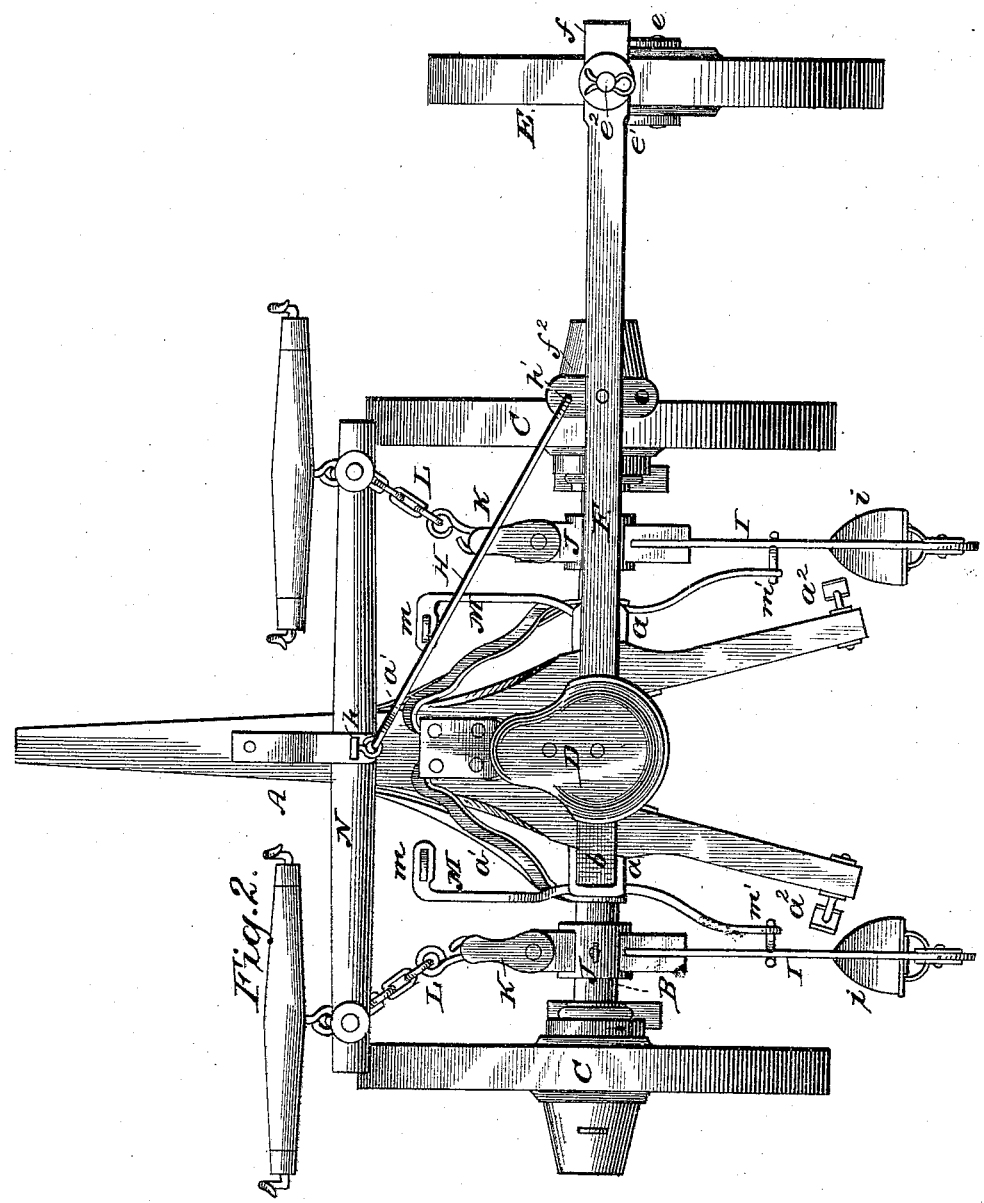
WITNESSES:
Fred. G. Dieterich
John C. Kenron
INVENTOR:
R. M. Henderson
BY Munn & Co
ATTORNEYS.

(No Model.)  
3 Sheets—Sheet 3.
R. M. HENDERSON.
PLOW AND CULTIVATOR.
No. 323,676. Patented Aug. 4, 1885.
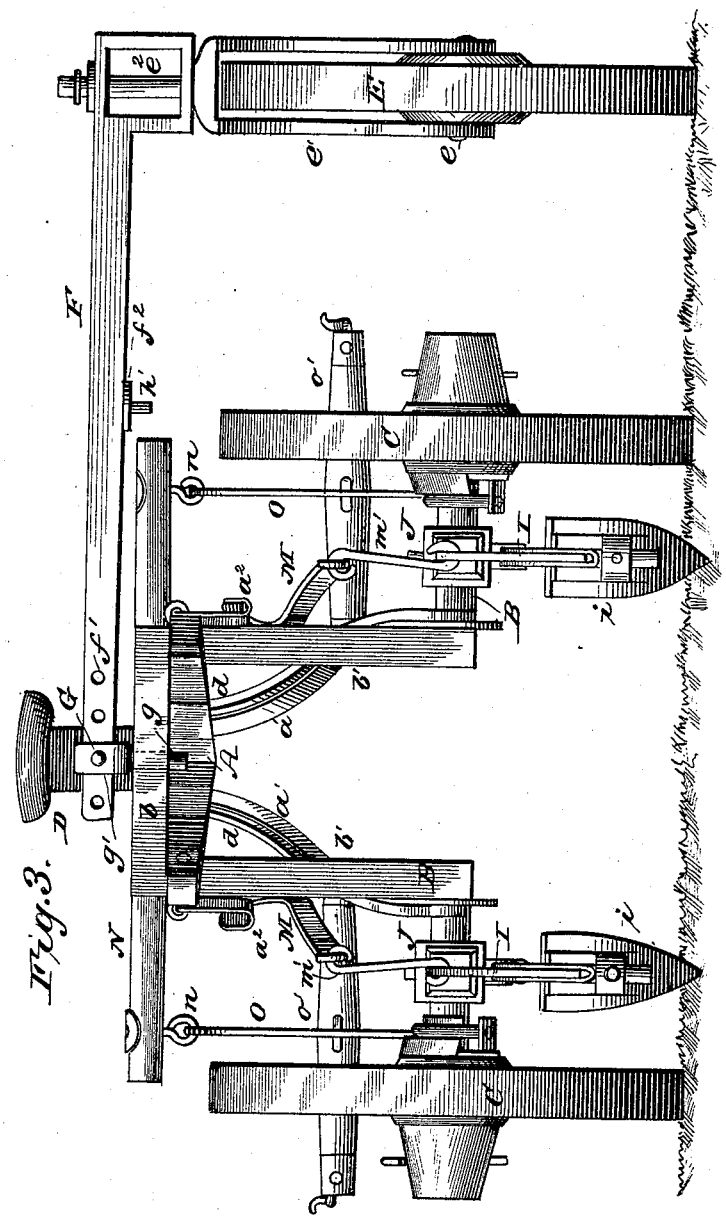
WITNESSES:
Fred. G. Dieterich
John C. Kernon
INVENTOR:
R. M. Henderson
BY Munn & Co.
ATTORNEYS.

United States Patent Office.

ROBERT M. HENDERSON, OF LEESVILLE, IND., ASSIGNOR OF ONE-HALF TO JOHN W. HENDERSON, JAMES M. HENDERSON, JR., FRANCIS MARION HENDERSON, AND HOMER B. GOEN, ALL OF JACKSON COUNTY, IND.

PLOW AND CULTIVATOR.

SPECIFICATION forming part of Letters Patent No. 323,676, dated August 4, 1885.

Application filed April 15, 1885. (No model.)

*To all whom it may concern:*

Be it known that I, ROBERT M. HENDERSON, of Leesville, Lawrence county, Indiana, have invented a new and Improved Combined Plow and Cultivator; and I do hereby declare the following to be a full, clear, and exact description of the same, reference being had to the accompanying drawings, forming a part of this specification, in which—

Figure 1 is a side elevation of my improved plow with one of the wheels removed. Fig. 2 is a plan view of the same. Fig. 3 is an elevation looking at the rear of the plow. Fig. 4 is a side elevation of one of the cultivator attachments and those portions of the plow-framing to which it is fastened. Fig. 5 is a plan view of the same.

This invention relates to plows used by corn-growers; and it consists in the detailed construction of the parts hereinafter described, and pointed out in the claims.

In the accompanying drawings, similar letters of reference indicate corresponding parts in all the figures.

A is the tongue of the plow, to which the team is attached, provided with clamps $a$ and braces $a'$, by which it is firmly secured to the axle B, upon which the plow-wheels C revolve. The end of shaft A is made forked and provided with swinging hooks $a^2$, over which the plow-beams may be hung when the plows are not in use.

D is the seat for the driver supported from the axle by the stay-bars $d$. These bars $d$ are attached at their lower ends to the cranked axle near its lower end, and extend thence up and forward and are united at a point above the tongue and in advance of the axle. By this construction the driver's seat is supported forward near the team and is out of the way of the swinging of the bar F. At the same time the weight of the driver is almost entirely removed from the neck of the team.

The axle B is cranked upward in the center so as to form a horizontal portion, $b$, under the driver's seat, to which the arm which carries the guide-wheel may be pivoted, and vertical portions $b'$, to which the foot-levers for working the plows and cultivators may be attached.

E is the guide-wheel, running on the pin $e$ of the forked frame $e'$, which is provided with the pivot $e^2$ for attaching it to the end $f$ of the guide-wheel arm F.

G is a double eye working on the pivot $g$, which passes through the center of the horizontal portion $b$ of the axle, and is provided with the pin $g'$, which engages with either of the series of holes $f'$, in the end of the guide-wheel arm.

H is a rod hinged to the pin $h$, which passes through the shaft A, and is provided with the hook $h'$ at its other end for engaging with either of the holes in plate $f^2$ attached to the arm F. It will be seen that the arm F can be attached to the double eye G to suit any width of row required, and that the said double-eye, together with the axle and the guide wheel arm, constitutes a universal joint, so that the movements of the plow in passing over the surface of uneven ground are not communicated to the guide-wheel, and that the plow can be turned round at the end of a row (by unhooking rod H and afterward coupling it to the opposite hole in plate $f^2$) without moving the guide-wheel. The object of this wheel E is to gage the width of rows when marking off ground to plant, and it is intended to run in the last-formed furrow. This wheel is removed in cultivating the growing plants.

I are the plow-beams provided with the plow-shares $i$ attached to them by means of the junction-pieces $i'$, pivoted to the ends of each of the plow-beams and provided with the wooden pins $i^2$. Each plow-beam is secured to the socket J, pivoted on the axle B, inside wheels C, and provided with the lug $j$, through which the vertical pin $k$ of the clevis K passes. The clevis K is further provided with the series of holes $k'$, for the attachment of the stay-chains L.

M is a lever pivoted to the vertical portion $b'$ of the axle, and provided with the end $m$ for the foot of the driver, and with a coupling-rod, $m'$, engaging with the other end of the said lever and with the beam of the plow or cultivator, so that the depth of cut of the plow-shares $i$ can be regulated by the feet of the driver, thus leaving his hands free for driving the team.

M is the main double-tree pivoted to the shaft A by the pin $h$ and provided with eyes $n$.

O is a draft-bar attached to one of the eyes $n$ at one end and to the stay-chains L at the other.

$o$ are holes to which the double-tree $o'$ may be attached as found convenient to regulate and balance the draft.

The end of stay-chains may be attached to either of the holes $k'$ in the clevis K, according to whether it is desired to make the plow-shares cut in deep or shallow.

To cultivate the corn when growing, I provide the double-beam plows or cultivators P, to be used in place of the single-beam plows above described. I attach each of these double-beam plows to the axle B by means of the socket R, which is similar to the socket J, except that it is provided with the double eye $r$ at the rear end of it. The ends of the double beams of the cultivators P are pivoted on the pin $r'$, passing through them and through the double eye $r$, so that the necessary side motion of the cultivator plow-shares can be obtained by means of the handle $p$, securely fastened to the said double beams.

The foot-lever M is attached to the cultivators P by the rod $m'$, as before described.

Having thus described my invention, what I claim as new, and desire to secure by Letters Patent, is—

1. In a plow, the combination, with the plow-axle, of the guide-wheel running in a frame pivoted to one end of the guide-wheel bar, the double eye pivoted to the plow-axle, and the guide wheel bar provided with a series of holes by which it may be connected to the pin of the double eye, substantially as described and shown, and for the purpose set forth.

2. In a plow, the combination of the plow-axle, the guide-wheel running in a frame pivoted to one end of the guide-wheel bar, the double eye pivoted to the plow-axle, the guide-wheel bar provided with a series of holes in one end of it, and the plate $f^2$, having holes therein, and the hooked bar hinged to the main plow-shaft and engaging with either of the holes in plate $f^2$, according to the direction of the travel of the machine, substantially as described and shown, and for the purpose set forth.

3. In combination with the axle having a central upwardly-cranked portion, and the tongue secured to such axle, the seat-supports $d$ $d$ secured at their lower ends each to the arms of the cranked axle near its lower end and having their other ends extended up and forward and united above the tongue at a point in advance of the axle, substantially as set forth.

4. The combination, with the cranked axle, the tongue, and the marker-bar pivotally supported on such axle, of the seat-supports $d$ $d$, secured to the cranked axle near its lower end and projected up and forward to a point above the tongue in advance of the cranked axle, substantially as set forth.

5. The combination of the double-beam cultivators P, having guiding-handles $p$, the sockets R, having double eyes $r$, and pins $r'$, on which said double beams are pivoted, foot-lever M, having coupling-rod $m'$, axle B, cranked upward in the center, upon which sockets R are pivoted, clevises K, pivoted to sockets R and provided with holes $k'$, stay-chains L, draft-bar O, main double-tree N, and main shaft A of the plow, having forked ends provided with the swinging hooks $a^2$, substantially as described and shown, and for the purpose set forth.

ROBERT M. HENDERSON.

Witnesses:
DAVID NEWKIRK,
ROBERT D. THOMPSON.